United States Patent [19]

Kicherer et al.

[11] 4,302,662
[45] * Nov. 24, 1981

[54] CONTROL INSTRUMENT FOR ELECTRIC HOT PLATES

[75] Inventors: Robert Kicherer, Knittlingen; Wilfried Schilling, Kraichtal, both of Fed. Rep. of Germany

[73] Assignee: E.G.O. Regeltechnik GmbH, Fed. Rep. of Germany

[*] Notice: The portion of the term of this patent subsequent to Jul. 22, 1997, has been disclaimed.

[21] Appl. No.: 67,087

[22] Filed: Aug. 16, 1979

Related U.S. Application Data

[63] Continuation-in-part of Ser. No. 922,027, Jul. 5, 1978, Pat. No. 4,214,151.

[30] Foreign Application Priority Data

Aug. 23, 1978 [DE] Fed. Rep. of Germany ....... 2836882

[51] Int. Cl.³ .............................................. H05B 1/02
[52] U.S. Cl. .................................. 219/491; 219/492; 219/493; 219/511; 337/183; 337/115
[58] Field of Search .............. 219/490, 491, 492, 493, 219/494, 511, 516; 307/106, 96; 337/16, 35, 40, 51, 183, 115

[56] References Cited

U.S. PATENT DOCUMENTS

| 3,155,815 | 11/1964 | Clapp | 219/492 |
| 3,251,980 | 5/1966 | Moles | 219/493 |
| 3,541,429 | 11/1970 | Martin | 219/492 |
| 3,588,448 | 6/1971 | Ziver | 219/511 |
| 4,134,005 | 1/1979 | Eppens | 219/492 |
| 4,135,122 | 1/1979 | Holmquist et al. | 219/492 |
| 4,214,151 | 7/1980 | Kicherer et al. | 219/492 |

FOREIGN PATENT DOCUMENTS

| 0696996 | 11/1964 | Canada | 219/492 |
| 2731782 | 1/1979 | Fed. Rep. of Germany | 219/492 |
| 0907345 | 10/1962 | United Kingdom | 219/492 |
| 1190615 | 5/1970 | United Kingdom | 219/492 |

Primary Examiner—Gene Z. Rubinson
Assistant Examiner—M. Paschall
Attorney, Agent, or Firm—Steele, Gould & Fried

[57] ABSTRACT

A control instrument is used for the manually continuously adjustable supply of electric power to electric hot plates in the form of individual power pulses. The control instrument contains a switch, operated by a bimetallic member, whose heater is controlled by an electronic circuit and supplies current to the heating means in individual half-waves. An automatic initial cooking device with an electronic timing member is provided which, during the initial cooking phase, reduces the power supply to heater in a predetermined ratio and consequently correspondingly increases the power supplied to the electric hot plate. The automatic initial cooking device is automatically switched on by the control instrument knob. By rotating the control knob beyond a median power limit the automatic initial cooking device is switched off.

5 Claims, 5 Drawing Figures a)

b)

c)

1

CONTROL INSTRUMENT FOR ELECTRIC HOT PLATES

CROSS-REFERENCES

This is a Continuation-In-Part of our co-pending Application Ser. No. 922,027, filed July 5, 1978, and now U.S. Pat. No. 4,214,151.

BACKGROUND OF THE INVENTION

The invention relates to a control instrument for electric hot plates with an adjustable power control device, which contains an expansion element with an electrical heating means, and with a time switch which, for a period of time, increases the output of the power control device in the initial cooking phase. The time switch contains an electronic counter as the timing member and at least one divider which, by means of an electronic switch element, reduces the power supplied to the heating means in a predetermined division ratio.

In such a control instrument known from U.S. Ser. No. 922,027 filed by Robert Kicherer and Wilfried Schilling on July 5, 1978 the complete time switch means is replaced by electronic components. All the mechanical parts for the timing member and the power switch are dispensed with, because the electronic switch element has only to switch the very limited power of the bimetallic member heating means for the power control device. However, the reliable quantizing power control device is retained for switching the high power to the hot plate. The hot plate only requires a single load heating resistance which is quantized by the power control device.

A pushbutton, which is operable independently of the adjusting toggle is provided for switching on the automatic initial cooking device formed by the time switch. It would also be possible to use an adjusting toggle which, in addition to its adjustment function, by rotation also assumes the pushbutton function by starting up the automatic initial cooking device on being depressed. Besides certain mechanical difficulties and the fact that the button requires a certain travel, the switching on of the automatic initial cooking device requires an additional operation, so that it is frequently not used.

BRIEF SUMMARY OF THE INVENTION

The object of the present invention, particularly in the case of a control instrument as defined hereinbefore is to further simplify its operation and the arrangement thereof on a cooker or the like.

According to the invention this object is achieved in that the power switch, which can be switched on in a lower power range (continuous cooking range), can be automatically switched on by a manually operable adjusting means on setting a power level in the continuous cooking range. Thus, the operator no longer has to operate a separate button or knob. Installation is also simplified because there is no need to provide a separate switching-on knob or other separate operation measures.

According to the invention an embodiment in which the time switch can be automatically switched off by the adjusting means on exceeding the limit to the higher power range (frying range) is particularly advantageous. Thus, the automatic switching-on device, which is in any case only advantageous in the continuous cooking range, is switched off in the frying range, specifically on exceeding this limit in both directions. Thus, switching off does not only occur on switching from the continuous cooking range to the frying range, but also in the reverse direction, so that on switching down from the frying range to the continuous cooking range the automatic initial cooking device is no longer operating. It is also no longer necessary in this case, because the hot plate has already operated in the frying range, i.e. in the higher power range. In this way it is possible to bring about an intentional switching off of the automatic initial cooking device, either by briefly switching the adjusting means briefly over this limit from below and then back into the continuous cooking range or by the setting taking place directly from zero via the higher power range into the continuous cooking range.

Thus, according to an advantageous embodiment the adjusting means can be a per se known rotatable knob which, when rotated from the off position in the direction of increasing power, the time switch can be switched on, while the rotation in the opposite direction does not bring about the switching on of the time switch.

According to preferred embodiments a contactor can be operable for producing a switching-on pulse for the time switch between the off position and the lowest power stage and/or between the lower and upper power ranges (continuous cooking and frying ranges) a contact, which may be present in any case, produces an off pulse for the time switch. On regulating from the "0" position in the direction of increased relative switching-on period the contact is only briefly inched by means of trip cams before stage 1, i.e. there must be no permanent contact, because otherwise it would not be switched off at the end of the initial cooking period.

On further rotation from the continuous cooking range F into the frying range B in addition to the change in the division ratio the existing residual initial cooking time is cancelled out through the cams keeping the switch closed over the entire frying range.

BRIEF DESCRIPTION OF THE DRAWINGS

An embodiment of the invention will now be described in non-limitative manner with reference to the drawings, wherein.

DETAILED DESCRIPTION OF THE PREFERRED EMBODIMENTS

Figure 1:
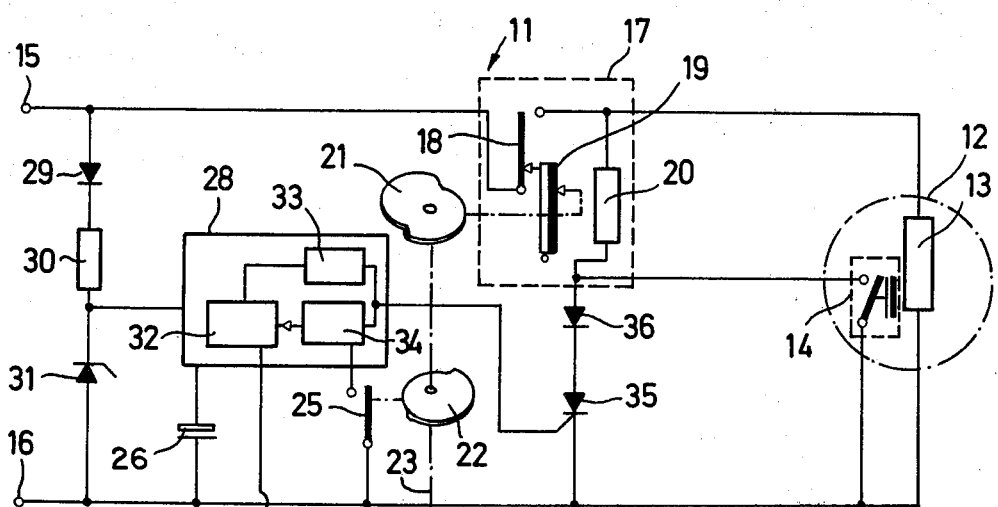
FIG. 1 is a diagrammatic circuit diagram of a control instrument according to the invention.

FIG. 1 shows a control instrument 11 provided for the power control of an electrical hot plate 12 having a load heating resistance 13 and a temperature protection switch 14. The control instrument 11 is connected be means of terminal 15, 16 to the domestic mains and has a conventional quantizing power control device 17 switched into a terminal of the load heating resistance 13 and supplies to the latter the quantized power, i.e. in power pulses, whose relative switching-on period is dependent on the setting of the power control device and its heating means. The mechanically/thermally operating power control device contains a snap switch 18 operated by an expansion member, for example a bimetallic member 19. The latter is provided with a heating means 20 and by means of a setting cam 21 can be adjusted in its position relative to switch 18.

The heating means 20 is connected in parallel to the load heating resistance 13, i.e. as a potential winding and can be given a relatively high power, e.g. of 20 Watt, so that it can be easily produced even for higher mains voltages.

Setting cam 21 is mounted together with a trip cam 22 on a setting shaft 23, which can be manually rotated by an adjusting toggle 24. Trip cam 22 operates a switch contact 25 which is closed in the upper power range (frying range B).

The setting shaft 23 also carries a contact cam 40 which can operate a contactor 41 which is so arranged with respect to cam 40 that, in a manner to be described hereinafter, it can be operated at the start of the cooking range. Contactor 41 produces a switching-on pulse and contact 25 inter alia a switching-off pulse, which can switch on or off the counter 32. Contactor 41 can be a switch contact.

The control instrument 11 also contains an integrated circuit (IC) 28 which is supplied with the corresponding low voltage from the mains by means of a bridge circuit of a diode 29 with a resistance 30 on the one hand and a Zener diode 31 on the other. A capacitor 26 also forms part of the power supply system.

The IC contains an electronic counter 32 and two dividers 33, 34 which, as structural groups are indicated in block circuit manner. The counter forms a timing member, i.e. by counting the mains half-waves it permits the passage of a predetermined time of e.g. nine minutes before supplying an output signal to the divider 33 associated therewith. Counter 32 is started up by the switching-on contactor 41, while contact 25 controlling divider 34 can switch off counter 32 before it has completed its running time. From the dividers the IC output line leads to a thyristor 35, which is connected in series with the heating means 20 of the power control device 17. A diode 36 is connected in series therewith and serves as a protection against overvoltages.

Divider 33 is designed in such a way that during the operation of counter 32 it controls thyristor 35 so that the latter only permits the passage of every fifth half-wave of the mains current, while divider 34 is designed in such a way that, when switched on by closing contact 25, it controls the thyristor to permit the passage of every other half-wave on the alternating current.

The operation of the control instrument shown in FIG. 1 will be explained hereinafter relative to FIGS. 2 and 3.

Figure 3:
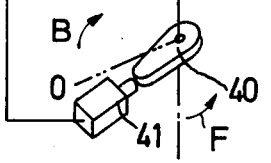
FIG. 3 is a diagram of the power pattern as a function of the power setting divided up from 1 to 12, the same type of lines being used in both FIGS. 2 and 3 for the individual operating modes.
Figure 2:
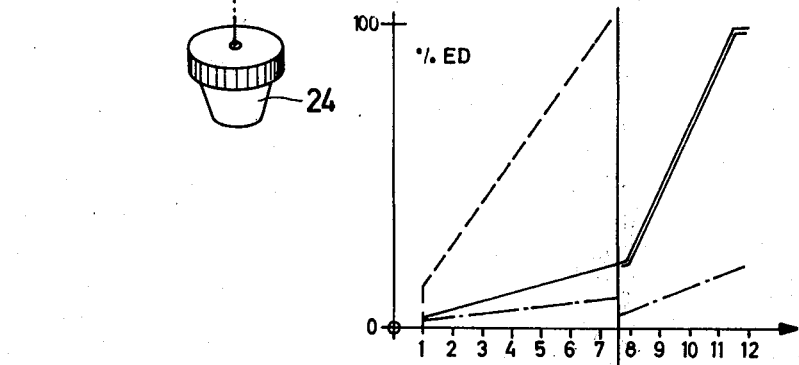
FIG. 2(a), FIG. 2(b) and FIG. 2(c) are each a diagram of the power pulses supplied to the power control device heating means in three different operating states of the control instrument according to the invention.
Figure 2:
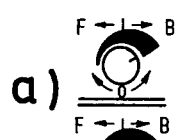
Figure 2:
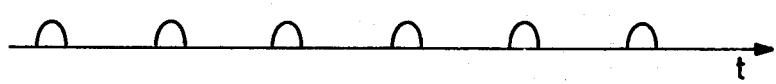
Figure 2:
Figure 2:
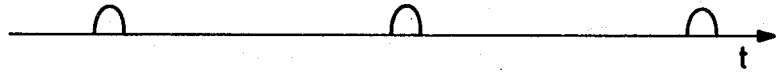
Figure 2:
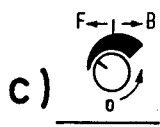
Figure 2:
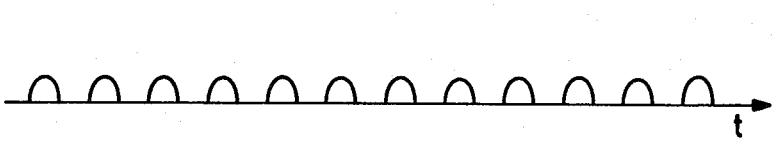

In FIGS. 2 and 3 the single continuous line indicates operation without an automatic initial cooking device in the continuous cooking range F (FIG. 2c), the broken line indicates operation in the continuous cooking range with the automatic initial cooking device (FIG. 2b) and the double line operation in the frying range, i.e. the higher power range (FIG. 2a). The dot-dash line indicates the no-load limit, not illustrated in FIG. 2, by the response of the temperature protection switch 14.

If, as shown in FIG. 2a, the adjusting toggle 24 is rotated into the frying range, whereby said rotation can take place in either direction, contact 25 is closed. Divider 34 starts operating and ensures that thyristor 35 only permits the passage of every other half-wave of the alternating current, so that the design power of the heating means 20 is only 25% effective, i.e. there is an actual power of 5 Watt for a 20 Watt design power. The automatic initial cooking device is not switched on in this higher power range (frying range), because on rotation from the off position by the shortest route into the top power range (i.e. in counterclockwise direction in the drawing) the cam 40 has not passed the switching-on contactor 41 and the closed contact 25 keeps counter 32 switched off. On rotating in the clockwise direction to the same power value, i.e. through the lower power range (continuous cooking range F) the counter is initially switched on by the switching-on contactor 41, is immediately switched off by closing contact 25, which resets counter 32.

In FIG. 2b a power is set in the continuous cooking range F by rotating in the clockwise direction, i.e. from the off position and through the lowest power setting. Between the off position and the lowest power setting the switching-on contactor 41 is operated by the contact cam 40 which starts the counter 32 operating. The latter has started up and has activated the divider in such a way that the thyristor 35 only permits the passage of every fifth half-wave, i.e. only 10% of the design power or 20% of the power normally supplied to the heating means 20 in the continuous cooking range (FIG. 2c). Thus, the heating up of the bimetallic member 19 takes much longer and the relative switching-on period is increased by about five times, which means that when counter 32 is operating, the power set on toggle 24 is always increased five times (broken line in FIG. 3). When this cooking support lasts a constant time a power increased by a fixed amount is supplied, but is dependent on the control instrument setting. Here again the power dissipation is very low and can be a maximum of 2 Watt.

At the end of the fixed-programmed-in time, or the time set on counter 32, the automatic initial cooking device is switched off and thyristor 35 now permits the passage of every positive or negative half-wave of the alternating current, so that the heating means 20 of bimetallic member 19 is heated with 10 Watt. The power supplied to the hot plate 12 returns to 1/5 of the power, whose passage was permitted with respect to the automatic initial cooking device (continuous line in FIG. 3).

As shown in FIG. 2c the same effect is obtained if the adjusting toggle 24 is rotated in counterclockwise direction into the continuous cooking range, i.e. through the frying range towards a lower power setting. The switching-on contactor 41 is not passed by the contact cam 40 and the control instrument operates without the automatic initial cooking device. The same effect is also obtained if on clockwise rotation of the toggle, i.e. in the rising power direction, the limit between the continuous cooking range F and the frying range B is passed and then there is a return to the continuous cooking range. Although initially in this case the automatic initial cooking device (counter 32 and divider 33) is switched on, it is switched off again after passing the limit between F and B.

Thus, the invention provides a very advantageous operation of the control instrument. In the case of a normal power setting in the continuous cooking range there is generally a cold cooking product, so that an automatic initial cooking device with a time-limited power increase is advantageous. However, if for example after a frying operation the power is regulated down from the frying range to the continuous cooking range the automatic power increase, which would be disadvantageous, is switched off. This operating procedure also automatically takes account of the operation without knowing the function of the automatic initial cooking device. If, as is necessary with a conventional seven-speed circuit, someone initially sets a high power for initial cooking, i.e. in the frying range and then, after the cooking product has become heated, regulates down into the initial cooking range, as desired, the automatic initial cooking device remains inoperative.

The advantages resulting from the previous indentified patent application are fully retained here. A control instrument is provided, which can be manufactured with a minimum of mechanical costs, while high switching capacities are still not required of the electronic components. The invention can be used with particular advantage with the control device shown in FIG. 1 with electronic regulation and mechanical/thermal power switching. However, it can also be used with power control devices which operate purely mechanically or purely electronically.

The invention is not limited to the embodiments described and represented hereinbefore and various modifications can be made thereto without passing beyond the scope of the invention.

What is claimed is:

1. A control instrument for electric hot plates with an adjustable quantizing power control device which has manually, substantially continuous adjusting means and supplies power to the electric hot plates in individual power pulses, comprising; an expansion member with an electrical heating means, and a time switch, which for a period of time, increases the output of the power control device in an initial cooking phase, the time switch including an electronic counter as a timing member and at least one divider which, by means of an electronic switch element, reduces the power supplied to the heating means in a predetermined division ratio, wherein the time switch, which can be switched on in a lower power, continuous cooking range, can be automatically switched on by the manual adjusting means being adjusted to a power setting in the continuous cooking range.

2. A control instrument according to claim 1, further comprising means for automatically switching off the time switch responsive to the adjusting means being adjusted to a setting exceeding the limit of the continuous cooking range, in a higher power, frying range.

3. A control instrument according to claim 1, wherein the adjusting means is a rotatable knob which switches on the time switch when rotated from the off position in the direction of increased power, but when rotated in the opposite direction, does not switch on the time switch.

4. A control instrument according to claim 1, wherein a contactor for producing a switching-on pulse for the time switch responsive to the adjusting means is operable between the off position and the lower, continuous power range.

5. A control instrument according to claim 1, wherein a contact responsive to the adjustment means is operable between the lower and the upper power ranges to produce a switching-off pulse for the time switch.

* * * * *

UNITED STATES PATENT AND TRADEMARK OFFICE
CERTIFICATE OF CORRECTION

PATENT NO. : 4,302,662
DATED : November 24, 1981
INVENTOR(S) : Kicherer et al

It is certified that error appears in the above–identified patent and that said Letters Patent are hereby corrected as shown below:

At column 2, line 61, delete "be" and insert --by--.
At column 2, line 62, delete "terminal" and insert --terminals--.
At column 4, line 14, after "contactor 41," insert --but--.
At column 5, line 12, delete "previous" and insert --previously--.
At column 5, line 32 (Claim 1, line 5), delete ";" and insert --:--

Signed and Sealed this

Ninth Day of March 1982

[SEAL]

Attest:

GERALD J. MOSSINGHOFF

Attesting Officer   Commissioner of Patents and Trademarks